Patented June 27, 1950

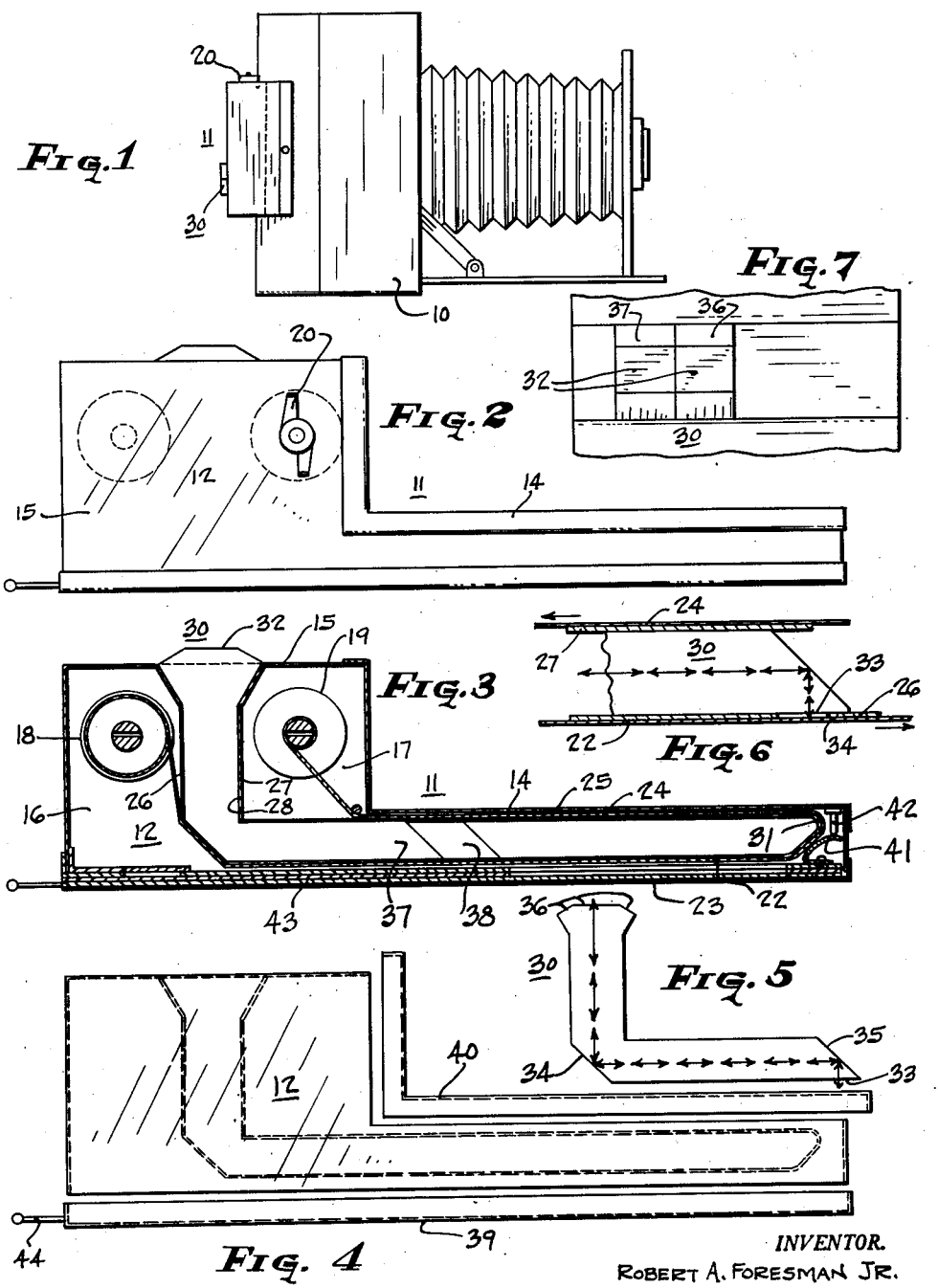

2,513,017

UNITED STATES PATENT OFFICE 2,513,017

ROLL FILM ADAPTER FOR CAMERAS

Robert A. Foresman, Jr., Media, Pa.

Application June 3, 1948, Serial No. 30,872

4 Claims. (Cl. 95—34)

1

The invention relates to adapters for cut-film, film-pack or plate cameras of the spring back type, enabling the use therewith of standard roll film and it has for an object to provide apparatus of this character having periscopic means for observing the back marking of a film portion positioned for exposure.

A more particular object of the invention is to provide apparatus of the above character wherein a housing includes thin and thick portions, the thin portion being arranged for insertion into and removal from the camera and the thick portion having unexposed and exposed film spool compartments related to the thin portion so that film is moved outwardly from the unexposed spool along the front side of the thin portion and then along the back side of the latter for winding onto the exposed spool.

A further object is to provide a housing, as aforesaid, with a masking screen at the front side.

Still another object is to provide a housing of the above character with front and back covers which are removable for film insertion and removal and wherein the front cover has an insertable and removable masking screen.

A further object of the invention is to provide a housing, as aforesaid, with web structure separating the film spool compartments and front and back film web passages and accommodating a prism rendering visible to the user the back marking of the front film web.

The foregoing and other objects are effected by the invention as will be apparent from the following description and the accompanying drawings, in which:

Fig. 1 is a side elevational view of a film-pack camera having the film roll adapter applied thereto;

Fig. 2 is a fragmentary plan view of the adapter;

Fig. 3 is a longitudinal sectional view of the adapter;

Fig. 4 is an exploded view of the adapter housing;

Fig. 5 is a detail view of a prism;

Fig. 6 is a fragmentary detail view showing the cooperative relation of the prism and associated parts; and Fig. 7 is a detail view of the housing and showing prism outer ends.

In the drawings, there is shown a camera, at 10, of the conventional film-pack or cut film type and a roll film adapter, at 11, making it possible to use standard roll film in place of a film-pack or cut film and also to use standard roll film markings in positioning the film for successive exposures.

The adapter, at 11, comprises a housing, at 12, having a thin or flat portion 14 and a thick portion 15.

The flat portion 14 corresponds dimensionally to the film-pack, plate or cut film holder suitable for the camera and it is insertable into and removable from the latter in precisely the same manner.

The thick portion 15 of the housing is arranged to extend externally of the camera and it is provided with compartments 16 and 17 for unexposed and exposed film rolls or spools.

With an unexposed film spool 18 pivoted in place in the compartment 16, an empty spool 19 mounted in the compartment 17 and connected to the winding handle 20, and the outer end of the film connected to the latter, film in being wound from the spool 18 onto the spool 19 passes outwardly as a front web 22 adjacent to the front side 23 of the flat portion 14 and as a back web 24 adjacent to the back side 25 of such portion.

The housing is provided with a web structure comprised by spaced walls 26 and 27 defining a channel space 28 for accommodation of one or more periscopic prisms, at 30, by means of which roll film markings are rendered visible externally of the camera. The web structure separates the spool compartments 16 and 17 and it extends along the interior of the flat portion with its outer end 31 formed to provide means for reversing the direction of travel of the film incident to winding and unwinding thereof.

Each of the prisms, at 30, has its outer or window end 32 exposed for external viewing and its inner end formed with a polished surface or window 33 exposed, through the opening 34 in the wall 26, to the front web film back.

With a prism formed to use light economically and with the required window and prism surfaces 33, 34 and 35 of the necessary optical accuracy, light entering the exposed window end 32 is transmitted thereby and from the window surface 33 to illumine the adjacent film-back marking with the result that the observer sees the latter at the outer window end 32. Preferably, the outer end of the prism is formed with faces or facets 36 positioned to direct light inwardly of the prism structure so as to increase the amount of light transmitted. The prism may be made of any suitable material, for example, glass, transparent plastics or quartz. To enable the prism to use light efficiently, I prefer to employ material having a refractive index such that light is to a very large extent internally reflected and transmitted therealong.

While the prism means, at 30, may be comprised by a single prism of a length to locate the inner window surface 33 for the standard marking of a film portion positioned for exposure, I prefer to use two (or more) prisms 37 and 38, one of which is longer than the other, whereby different sizes of roll film may be used. Also, with this arrangement of prisms, when an oversize film roll is used, by observing successive film markings alternately through the prisms, the number of exposures may be increased or the film may be more effectively used.

Each prism is preferably of right-angular formation. This simplifies grinding to provide the prism faces as the latter are made parallel. Further, to avoid light loss, each prism, except for the window surfaces, is preferably covered with any suitable opaque or reflective material or substance.

The housing is formed with removable front and back covers 39 and 40. With the covers removed an empty spool may be transferred from the unexposed film spool compartment to the exposed film spool compartment and a fresh roll of film may be mounted in the unexposed film spool compartment. The outer end film roll web is then pulled outwardly along the front wall 26 of the web structure and then backwardly along the back wall 27 of the latter incident to attaching the free end thereof to the empty spool.

To shield the film from light when it is pulled out far enough to go around the web structure end 31, the front cover is replaced, such front cover having a light seal 41, which resiliently engages the film, and then pulling of film is continued for attachment of its outer end to the empty spool. Finally, the back cover is replaced, and preferably, means 42 is provided for disengaging the light seal from the film incident to replacement of the back cover.

The front cover is equipped with a masking screen 43 having a handle 44 and which is inserted to protect film from exposure to light when the adapter is removed from the camera.

What is claimed is:

1. In a roll film adapter for a film-pack or cut film camera, a housing including a thin flat portion and a thick portion; said flat portion being arranged for insertion into and removal from the camera; said housing including a web structure dividing the thick portion thereof into unexposed and exposed film spool compartments and separating film passages at the front and back of the flat portion; pivots for mounting film spools in the compartments with film from the unexposed spool extending as webs through the front and back passages to the exposed spool; said web structure including spaced walls and the front one of such walls in the flat portion having an opening which registers with back markings of film positioned for exposure; and a prism mounted in the space between the web structure walls, having outer and inner window surfaces with the inner window surface positioned to be parallel with the film front web in the flat portion and to register with said front wall opening and back markings of the film front web positioned for exposure, and having prism faces for reflecting light so that light entering the outer window surface is transmitted to a marking and reflected back from the latter to the outer window surface to render the marking visible at the latter.

2. The combination as claimed in claim 1, wherein the housing includes front and back covers which are removable for film changing.

3. The combination as claimed in claim 1 wherein the housing includes front and back covers, which are removable for film changing and the front cover carries an insertable and removable masking shield.

4. The combination as claimed in claim 1 wherein the housing includes front and back covers, which are removable for film changing and the front cover carries an insertable and removable masking shield, with a yieldable light seal, which engages the end of the film front web remote from the unexposed film spool incident to closing the front cover, and an interior projection carried by the back cover for disengaging the light seal from the film when the back cover is closed.

ROBERT A. FORESMAN, Jr.

REFERENCES CITED

The following references are of record in the file of this patent:

UNITED STATES PATENTS

| Number | Name | Date |
| --- | --- | --- |
| 764,910 | Brownell | July 12, 1904 |
| 1,631,299 | Washington | June 7, 1927 |
| 1,940,187 | Salchow | Dec. 19, 1933 |